(12) United States Patent
Mishima

(10) Patent No.: US 8,254,085 B2
(45) Date of Patent: Aug. 28, 2012

(54) STACKED ELECTRIC DOUBLE LAYER CAPACITOR

(75) Inventor: Masahiro Mishima, Numazu (JP)

(73) Assignee: Meidensha Corporation, Tokyo (JP)

( * ) Notice: Subject to any disclaimer, the term of this patent is extended or adjusted under 35 U.S.C. 154(b) by 158 days.

(21) Appl. No.: 12/674,528

(22) PCT Filed: Aug. 26, 2008

(86) PCT No.: PCT/JP2008/065143
§ 371 (c)(1),
(2), (4) Date: Feb. 22, 2010

(87) PCT Pub. No.: WO2009/031428
PCT Pub. Date: Mar. 12, 2009

(65) Prior Publication Data
US 2011/0110013 A1    May 12, 2011

(30) Foreign Application Priority Data
Sep. 7, 2007 (JP) .................... 2007-232202

(51) Int. Cl.
*H01G 9/00* (2006.01)
*H01G 4/30* (2006.01)
*H01G 4/228* (2006.01)
*H01G 9/10* (2006.01)
*H05K 5/03* (2006.01)

(52) U.S. Cl. .......... 361/502; 361/301.4; 361/520; 361/538

(58) Field of Classification Search .......... 361/301.4, 361/502, 520, 53
See application file for complete search history.

(56) References Cited

U.S. PATENT DOCUMENTS

| 3,323,026 | A | 5/1967 | Minami et al. |
| 4,783,723 | A | 11/1988 | Watanabe et al. |
| 6,147,305 | A | 11/2000 | Honma et al. |
| 6,392,868 | B2 * | 5/2002 | Ohya et al. .................... 361/502 |
| 6,426,862 | B1 | 7/2002 | Vasechkin et al. |
| 7,095,605 | B2 * | 8/2006 | Suenaga et al. ............... 361/523 |
| 7,209,342 | B2 * | 4/2007 | Matsui et al. ................. 361/502 |

(Continued)

FOREIGN PATENT DOCUMENTS

JP  2-065003 A  3/1990

(Continued)

OTHER PUBLICATIONS

U.S. Appl. No. 12/674,515, filed Feb. 22, 2010, Watanabe et al.

(Continued)

*Primary Examiner* — Jayprakash N Gandhi
*Assistant Examiner* — Dion Ferguson
(74) *Attorney, Agent, or Firm* — Foley & Lardner LLP

(57) ABSTRACT

A stacked electric double layer capacitor includes a capacitor unit, an aluminum laminate film, and a current collector terminal. The capacitor unit includes a pressure plate, and a current collector plate arranged inside the pressure plate. The aluminum laminate film wraps the capacitor unit, and includes a periphery that defines and surrounds a hole at a side surface of the capacitor unit. The current collector terminal is L-shaped, and includes a contact portion in contact with the current collector plate, and a terminal portion arranged perpendicular to the contact portion, wherein at least a part of the terminal portion is exposed through the hole of the aluminum laminate film, and connected to an external circuit, and the terminal portion is heat-welded to the aluminum laminate film.

4 Claims, 7 Drawing Sheets

U.S. PATENT DOCUMENTS

| | | |
|---|---|---|
| 7,835,136 B2 | 11/2010 | Feaver et al. |
| 2001/0021097 A1 | 9/2001 | Ohya et al. |
| 2003/0054239 A1 | 3/2003 | Watanabe et al. |
| 2004/0224226 A1 | 11/2004 | Endo et al. |
| 2008/0266752 A1 | 10/2008 | Thrap et al. |

FOREIGN PATENT DOCUMENTS

| | | | |
|---|---|---|---|
| JP | 4-240708 A | 8/1992 | |
| JP | 5-205872 A | 8/1993 | |
| JP | 6-069080 A | 3/1994 | |
| JP | 11-026953 A | 1/1999 | |
| JP | 2002-313677 A | 10/2002 | |
| JP | 2003-162989 A | 6/2003 | |
| JP | 2003-217985 A | 7/2003 | |
| JP | 2003-217986 A | 7/2003 | |
| JP | 2004-040938 A | 2/2004 | |
| JP | 2004-319098 A | 11/2004 | |
| JP | 2005-183556 A | 7/2005 | |
| JP | 2005-277346 A | 10/2005 | |
| JP | 2006-024660 A | 1/2006 | |
| JP | 2006-294985 A | 10/2006 | |
| JP | 2006-303269 A | 11/2006 | |
| JP | 2007-109775 A | 4/2007 | |
| RU | 2 038 657 C1 | 6/1995 | |

OTHER PUBLICATIONS

U.S. Appl. No. 12/674,519, filed Feb. 22, 2010, Horikoshi.
H. Watanabe et al., US PTO Non-Final Office Action, U.S. Appl. No. 12/674,515, dated Nov. 7, 2011, (11 pgs.).
R. Horikoshi US PTO Non-Final Office Action, U.S. Appl. No. 12/674,519, dated Nov. 9, 2011, (16 pgs.).
R. Horikoshi, US PTO Notice of Allowance, U.S. Appl. No. 12/674,519, dated Mar. 8, 2012, (6 pgs.).
H. Watanabe et al., U.S. Final Office Action, U.S. Appl. No. 12/674,515, dated Jun. 5, 2012, (14 pgs.).

* cited by examiner

STACKED ELECTRIC DOUBLE LAYER CAPACITOR

TECHNICAL FIELD

The present invention relates to stacked electric double layer capacitors, and particularly to current collector terminals of stacked electric double layer capacitors.

BACKGROUND OF THE INVENTION

Japanese Patent Application Publication No. 2006-24660 discloses a stacked electric double layer capacitor. This stacked electric double layer capacitor includes a capacitor unit as a unit composed of a plurality of cells connected in series, wherein electric energy enters or exits the capacitor unit through a current collector terminal.

FIGS. 7 to 9 show specific construction of the stacked electric double layer capacitor. FIG. 7 is a perspective view of the stacked electric double layer capacitor, FIG. 8 is a side view of the capacitor unit of FIG. 7 as viewed in the direction of an arrow B in which the current collector terminal is not exposed, and FIG. 9 is an enlarged view showing construction of a region C encompassed by a long dashed double-short dashed line in FIG. 8.

As shown in FIG. 7, the capacitor unit 10 is wrapped by an aluminum laminate film 20, the inside is vacuumed, and terminal portions 30c as brought-out parts of two current collector terminals 30 are heat-welded to a heat welded portion 21. These current collector terminals 30 are brought into contact with a current collector plate that is arranged inside a pressure plate 50.

As shown in FIGS. 8 and 9, the current collector terminal 30 includes: a contact portion 30a that is in contact with the current collector plate arranged inside the pressure plate 50; a portion 30b that is perpendicular to the contact portion 30a and perpendicularly bended to a side surface of the capacitor unit 10; and a terminal portion 30c that is perpendicularly bended with respect to the portion 30b, i.e., parallel to the contact portion 30a. The terminal portion 30c is connected to an external circuit not shown.

SUMMARY OF THE INVENTION

As shown in FIGS. 8 and 9, the conventional current collector terminal 30 includes the terminal portion 30c that is projecting from the capacitor unit 10, which leads to large space occupancy. There is a disadvantage that a device in which the capacitor is installed has a large size.

On the other hand, since the terminal portion 30c of the conventional current collector terminal 30 is projecting, there is need to exercise care to prevent the current collector terminal 3 from contacting something and causing a short circuit, when the capacitor is handled under charging.

The present invention has been made in attention to the problems described above. It is an object of the invention to provide a stacked electric double layer capacitor with small space occupancy, and improved safety in handling, based on improvement in the shape of a current collector terminal.

According to the present invention, a stacked electric double layer capacitor comprises: a capacitor unit including: a pressure plate; and a current collector plate arranged inside the pressure plate; an aluminum laminate film wrapping the capacitor unit, and including a periphery that defines and surrounds a hole at a side surface of the capacitor unit; and an L-shaped current collector terminal including: a contact portion in contact with the current collector plate; and a terminal portion arranged perpendicular to the contact portion, wherein at least a part of the terminal portion is exposed through the hole of the aluminum laminate film, and connected to an external circuit, and the terminal portion is heat-welded to the aluminum laminate film. The external circuit may be connected to the terminal portion via a pressure welding terminal. The terminal portion may include a threaded hole for connection to the external circuit. The terminal portion may include a socket hole for connection to the external circuit. A soft member may be arranged around the terminal portion inside the aluminum laminate film, having a thickness identical to that of the terminal portion so that the side surface of the capacitor unit is flat.

DETAILED DESCRIPTION

As described in detail below, stacked electric double layer capacitors according to embodiments of the present invention is equipped with a current collector terminal of an embedded type instead of a current collector terminal of a conventional projecting type, leading to small space occupancy, and improved safety in handling.

Embodiment 1

Figure 1A:
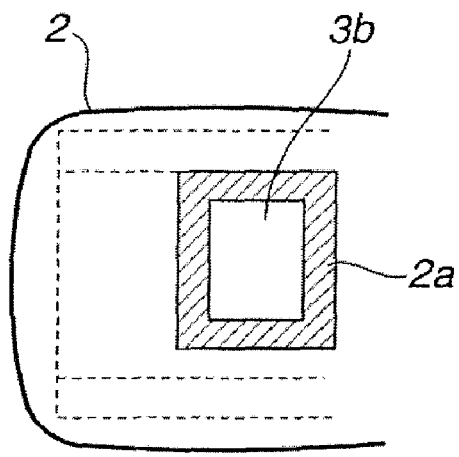
FIG. 1A is a side view of a stacked electric double layer capacitor according to a first embodiment of the present invention as viewed in a direction similar to a direction of an arrow A in FIG. 7.
Figure 1B:
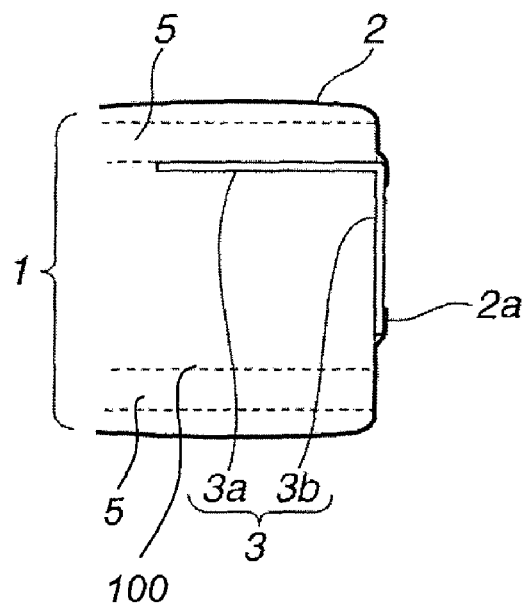
FIG. 1B is a side sectional view of the stacked electric double layer capacitor according to the first embodiment as viewed in a direction similar to a direction of an arrow B in FIG. 7, corresponding to FIG. 9.
Figure 7:
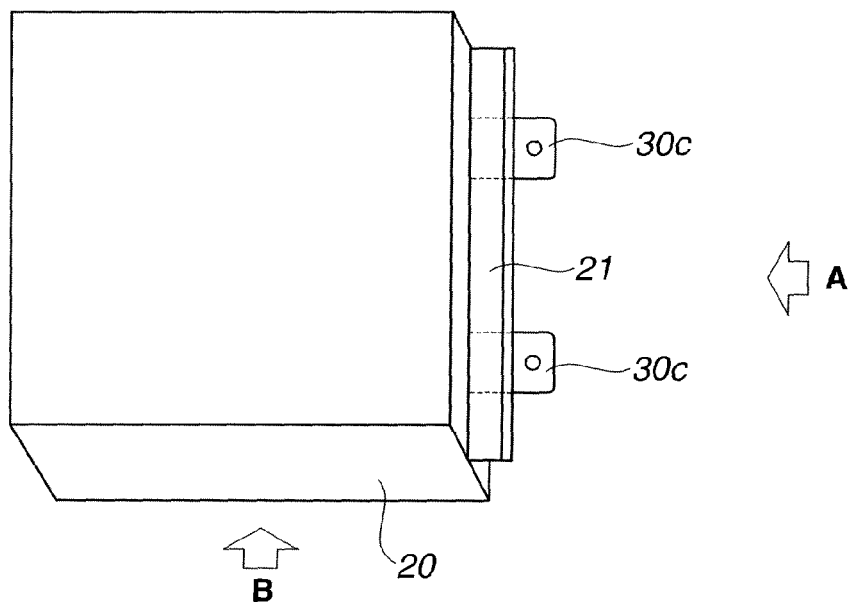
FIG. 7 is a perspective view of a conventional stacked electric double layer capacitor.
Figure 8:
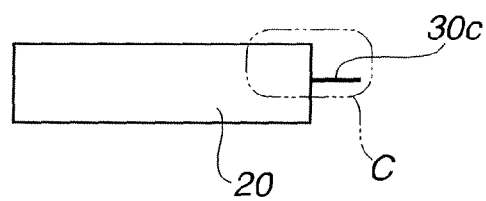
FIG. 8 is a side view of the conventional stacked electric double layer capacitor as viewed in the direction of the arrow B in FIG. 7.
Figure 9:
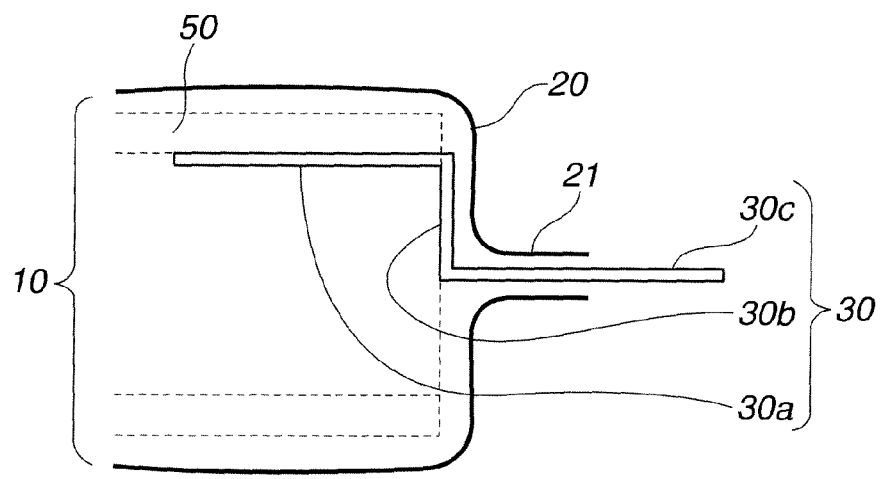
FIG. 9 is an enlarged view showing construction of a region C encompassed by a long dashed double-short dashed line in FIG. 8.

FIGS. 1A and 1B show a stacked electric double layer capacitor according to a first embodiment of the present invention. In this embodiment, a current collector terminal 3 is L-shaped. FIG. 1A is a side view of the stacked electric double layer capacitor according to the first embodiment of the present invention as viewed in a direction similar to a direction of an arrow A in FIG. 7. FIG. 1B is a side sectional view of the stacked electric double layer capacitor according to the first embodiment as viewed in a direction similar to a direction of an arrow B in FIG. 7, corresponding to FIG. 9.

Specifically, a capacitor unit 1, as a unit composed of a plurality of cells connected in series, is wrapped by an aluminum laminate film 2, and the inside is vacuumed. In the capacitor unit 1, the current collector terminal 3 is in contact with a current collector plate 100 that is arranged inside a pressure plate 5. The current collector terminal 3 includes a part exposed out of the aluminum laminate film 2.

As shown in FIG. 1B, the current collector terminal 3 is L-shaped, including a contact portion 3a in contact with the current collector plate arranged inside the pressure plate 5, and a terminal portion 3b perpendicular to the contact portion 3a, and connected to an external circuit at a side surface of the capacitor unit 1.

The aluminum laminate film 2 includes a hole for exposing the terminal portion 3b. A periphery of the hole in contact with the terminal portion 3b of the current collector terminal 3 forms a heat welded portion 2a that is heat-welded to a periphery of the terminal portion 3b, as indicated by hatching pattern in the figure. Thus, the terminal portion 3b of the current collector terminal 3 is exposed inside the heat welded portion 2a. The exposed terminal portion 3b is connected to the external circuit through a pressure welding terminal not shown.

In cases where a pressure welding terminal is used for connection to an external circuit, there is no need to thicken the terminal portion 3b among others. The thickness of the terminal portion 3b may be comparable to that of the contact portion 3a. This advantageously leads to a small space occupancy, which is the smallest as compared to embodiments described below.

Since the current collector terminal 3 of the stacked electric double layer capacitor according to this embodiment is L-shaped as described above, the capacitor is of an embedded current collector terminal type so that the current collector terminal 3 is not projecting from the capacitor unit 1. This advantageously leads to small space occupancy, and allows fabricating a compact device in which the capacitor is installed.

Since the capacitor is of an embedded current collector terminal type, there is no need to exercise care to prevent the current collector terminal 3 from contacting something and causing a short circuit, when the capacitor is handled under charging. Moreover, in cases where a pressure welding terminal is used for connection to an external circuit, it is advantageously possible to achieve the smallest space occupancy as compared to the embodiments described below.

Embodiment 2

Figure 2A:
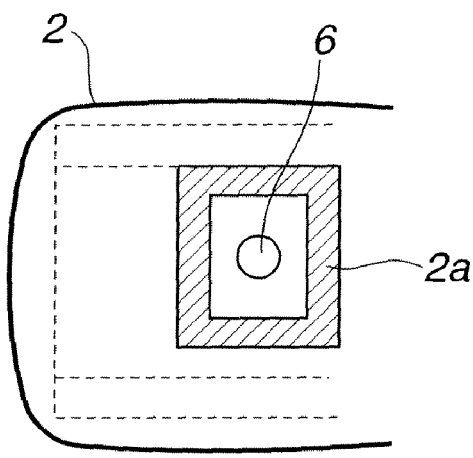
FIG. 2A is a side view of a stacked electric double layer capacitor according to a second embodiment of the present invention as viewed in a direction similar to the direction of the arrow A in FIG. 7.
Figure 2B:
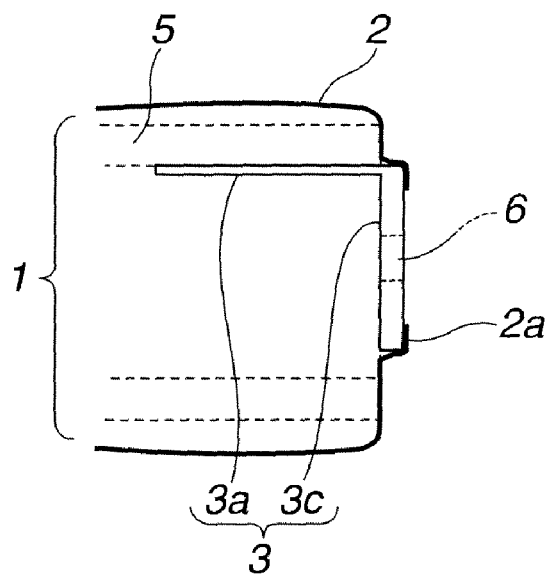
FIG. 2B is a side sectional view of the stacked electric double layer capacitor according to the second embodiment as viewed in a direction similar to the direction of the arrow B in FIG. 7, corresponding to FIG. 9.

FIGS. 2A and 2B show a stacked electric double layer capacitor according to a second embodiment of the present invention. In this embodiment, a current collector terminal 3 is L-shaped, and a threaded hole 6 is provided for connection to an external circuit. FIG. 2A is a side view of the stacked electric double layer capacitor according to the second embodiment of the present invention as viewed in a direction similar to the direction of the arrow A in FIG. 7. FIG. 2B is a side sectional view of the stacked electric double layer capacitor according to the second embodiment as viewed in a direction similar to the direction of the arrow B in FIG. 7, corresponding to FIG. 9.

Specifically, as shown in FIG. 2B, the current collector terminal 3 is L-shaped, including a contact portion 3a in contact with the current collector plate arranged inside a pressure plate 5, and a terminal portion 3c perpendicular to the contact portion 3a, and connected to an external circuit at a side surface of a capacitor unit 1. The terminal portion 3c is provided with the threaded hole 6 for connection to the external circuit. The thickness of the terminal portion 3c is set larger than that of the contact portion 3a, in order to ensure connection between the threaded hole 6 and a threaded terminal of the external circuit. The other construction is made as in the first embodiment, and an aluminum laminate film 2 is heat-welded to the terminal portion 3c, as in the first embodiment.

Since the current collector terminal 3 of the stacked electric double layer capacitor according to this embodiment is L-shaped as described above, the capacitor is of an embedded current collector terminal type so that the current collector terminal 3 is not projecting from the capacitor unit 1. This advantageously leads to small space occupancy, and allows fabricating a compact device in which the capacitor is installed. Moreover, there is no need to exercise care to prevent the current collector terminal 3 from contacting something and causing a short circuit, when the capacitor is handled under charging.

Moreover, in this embodiment, since the threaded terminal is used for connection between the terminal portion 3c provided with the threaded hole 6, and the external circuit, it advantageously leads to a large contact area and a large maximum current between the terminals.

Embodiment 3

Figure 3A:
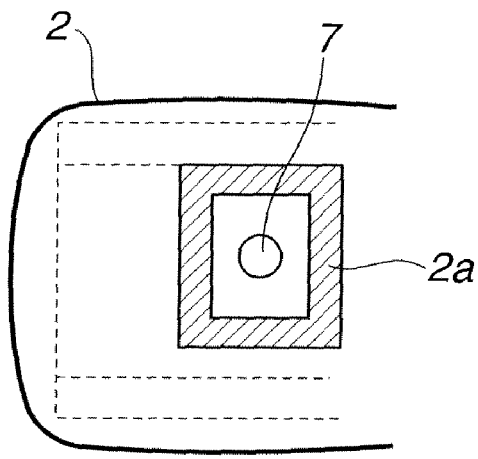
FIG. 3A is a side view of a stacked electric double layer capacitor according to a third embodiment of the present invention as viewed in a direction similar to the direction of the arrow A in FIG. 7.
Figure 3B:
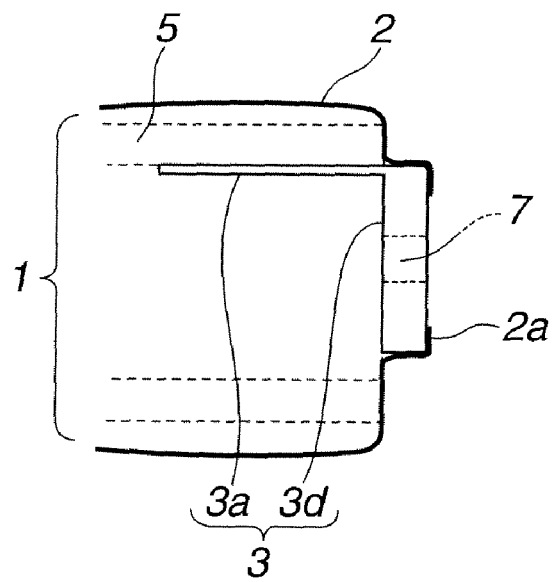
FIG. 3B is a side sectional view of the stacked electric double layer capacitor according to the third embodiment as viewed in a direction similar to the direction of the arrow B in FIG. 7, corresponding to FIG. 9.

FIGS. 3A and 3B show a stacked electric double layer capacitor according to a third embodiment of the present invention. In this embodiment, a current collector terminal 3 is L-shaped, and a socket hole 7 is provided for connection to an external circuit. FIG. 3A is a side view of the stacked electric double layer capacitor according to the third embodiment of the present invention as viewed in a direction similar to the direction of the arrow A in FIG. 7. FIG. 3B is a side sectional view of the stacked electric double layer capacitor according to the third embodiment as viewed in a direction similar to the direction of the arrow B in FIG. 7, corresponding to FIG. 9.

Specifically, as shown in FIG. 3B, the current collector terminal 3 is L-shaped, including a contact portion 3a in contact with the current collector plate arranged inside a pressure plate 5, and a terminal portion 3d perpendicular to the contact portion 3a, and connected to an external circuit at a side surface of a capacitor unit 1. The terminal portion 3d is provided with the socket hole 7 for connection to the external circuit. The thickness of the terminal portion 3c is set larger than that of the contact portion 3a, in order to ensure connection between the socket hole 7 and a socket terminal of the external circuit. The other construction is made as in the first embodiment, and an aluminum laminate film 2 is heat-welded to the terminal portion 3d, as in the first embodiment.

Since the current collector terminal 3 of the stacked electric double layer capacitor according to this embodiment is L-shaped as described above, the capacitor is of an embedded current collector terminal type so that the current collector terminal 3 is not projecting from the capacitor unit 1. This advantageously leads to small space occupancy, and allows fabricating a compact device in which the capacitor is installed. Moreover, there is no need to exercise care to prevent the current collector terminal 3 from contacting something and causing a short circuit, when the capacitor is handled under charging.

Moreover, in this embodiment, since the socket terminal is used for connection between the terminal portion 3d provided with the socket hole 7, and the external circuit, it advantageously leads to a large contact area and a large maximum current between the terminals. As compared to the threaded terminal, it is advantageously possible to simply perform the connection to the external circuit.

Embodiment 4

Figure 4A:
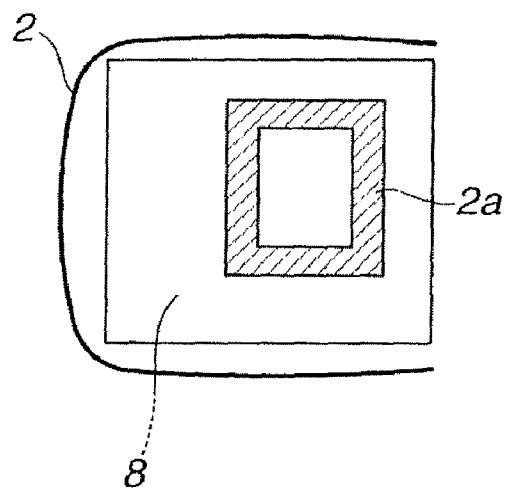
FIG. 4A is a side view of a stacked electric double layer capacitor according to a fourth embodiment of the present invention as viewed in a direction similar to the direction of the arrow A in FIG. 7.
Figure 4B:
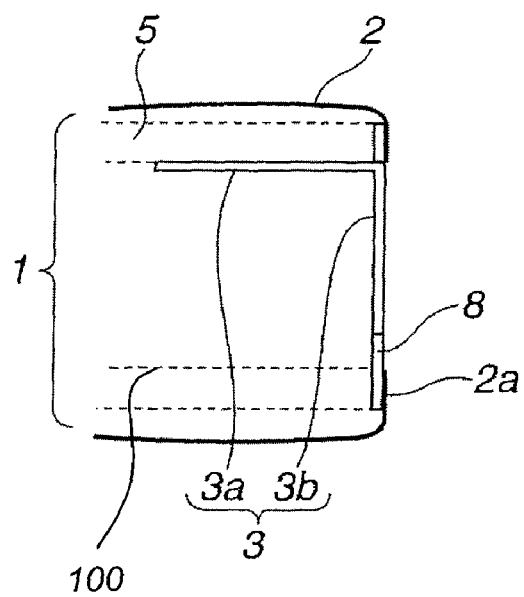
FIG. 4B is a side sectional view of the stacked electric double layer capacitor according to the fourth embodiment as viewed in a direction similar to the direction of the arrow B in FIG. 7, corresponding to FIG. 9.

FIGS. 4A and 4B show a stacked electric double layer capacitor according to a fourth embodiment of the present invention. This embodiment is presented by modifying the first embodiment so that the current collector terminal is covered by a protective rubber 8 as a soft member so that a side surface of the body is flat. FIG. 4A is a side view of the stacked electric double layer capacitor according to the fourth embodiment of the present invention as viewed in a direction similar to the direction of the arrow A in FIG. 7. FIG. 4B is a side sectional view of the stacked electric double layer capacitor according to the fourth embodiment as viewed in a direction similar to the direction of the arrow B in FIG. 7, corresponding to FIG. 9.

Specifically, the protective rubber 8 as a soft member is arranged around the terminal portion 3b inside the aluminum laminate film 2, having a thickness identical to that of the terminal portion 3b so that the side surface of the capacitor unit 1 is flat. The other construction is made as in the first embodiment.

This embodiment produces similar advantageous effects as in the first embodiment, and a further advantageous effect of preventing the aluminum laminate film 2 from being damaged and preventing the degree of vacuum from falling after vacuuming, by covering the current collector terminal with the protective rubber 8 so that the side surface of the capacitor unit 1 is flat.

Embodiment 5

Figure 5A:
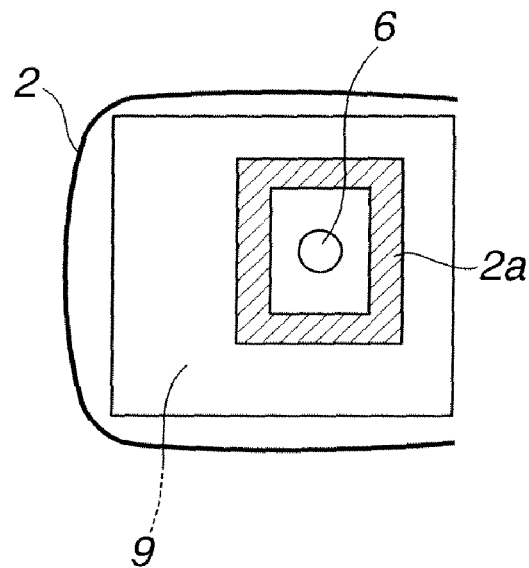
FIG. 5A is a side view of a stacked electric double layer capacitor according to a fifth embodiment of the present invention as viewed in a direction similar to the direction of the arrow A in FIG. 7.
Figure 5B:
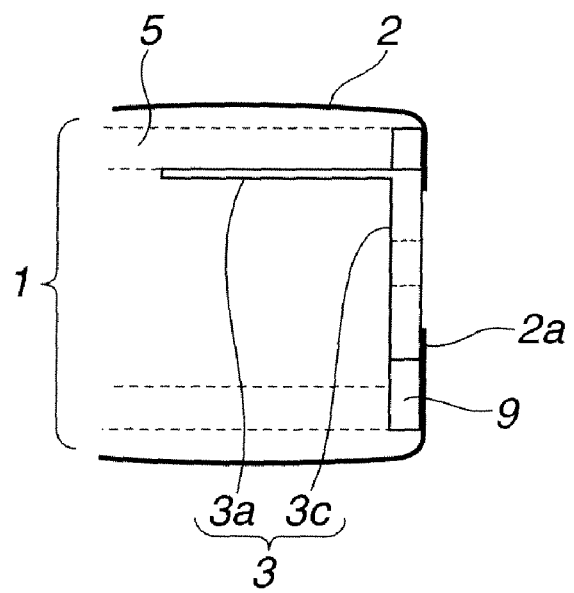
FIG. 5B is a side sectional view of the stacked electric double layer capacitor according to the fifth embodiment as viewed in a direction similar to the direction of the arrow B in FIG. 7, corresponding to FIG. 9.

FIGS. 5A and 5B show a stacked electric double layer capacitor according to a fifth embodiment of the present invention. This embodiment is presented by modifying the second embodiment so that the current collector terminal is covered by a protective rubber 9 as a soft member so that a side surface of the body is flat. FIG. 5A is a side view of the stacked electric double layer capacitor according to the fifth embodiment of the present invention as viewed in a direction similar to the direction of the arrow A in FIG. 7. FIG. 5B is a side sectional view of the stacked electric double layer capacitor according to the fifth embodiment as viewed in a direction similar to the direction of the arrow B in FIG. 7, corresponding to FIG. 9.

Specifically, the protective rubber 9 as a soft member is arranged around the terminal portion 3c inside the aluminum laminate film 2, having a thickness identical to that of the terminal portion 3c so that the side surface of the capacitor unit 1 is flat. The other construction is made as in the second embodiment.

This embodiment produces similar advantageous effects as in the second embodiment, and a further advantageous effect of preventing the aluminum laminate film 2 from being damaged and preventing the degree of vacuum from falling after vacuuming, by covering the current collector terminal with the protective rubber 9 so that the side surface of the capacitor unit 1 is flat.

Embodiment 6

Figure 6A:
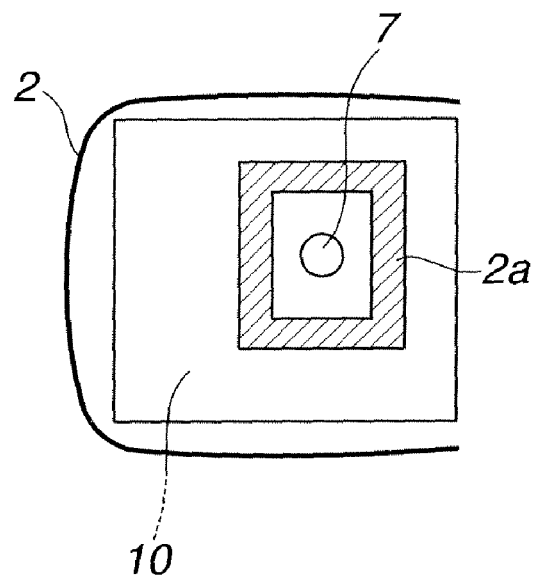
FIG. 6A is a side view of a stacked electric double layer capacitor according to a sixth embodiment of the present invention as viewed in a direction similar to the direction of the arrow A in FIG. 7.
Figure 6B:
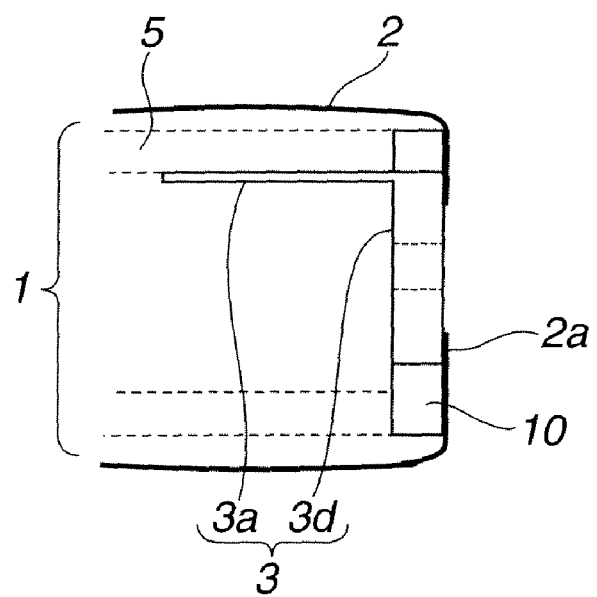
FIG. 6B is a side sectional view of the stacked electric double layer capacitor according to the sixth embodiment as viewed in a direction similar to the direction of the arrow B in FIG. 7, corresponding to FIG. 9.

FIGS. 6A and 6B show a stacked electric double layer capacitor according to a sixth embodiment of the present invention. This embodiment is presented by modifying the third embodiment so that the current collector terminal is covered by a protective rubber 10 as a soft member so that a side surface of the body is flat. FIG. 6A is a side view of the stacked electric double layer capacitor according to the sixth embodiment of the present invention as viewed in a direction similar to the direction of the arrow A in FIG. 7. FIG. 6B is a side sectional view of the stacked electric double layer capacitor according to the sixth embodiment as viewed in a direction similar to the direction of the arrow B in FIG. 7, corresponding to FIG. 9.

Specifically, the protective rubber 10 as a soft member is arranged around the terminal portion 3d inside the aluminum laminate film 2, having a thickness identical to that of the terminal portion 3d so that the side surface of the capacitor unit 1 is flat. The other construction is made as in the third embodiment.

This embodiment produces similar advantageous effects as in the third embodiment, and a further advantageous effect of preventing the aluminum laminate film 2 from being damaged and preventing the degree of vacuum from falling after vacuuming, by covering the current collector terminal with the protective rubber 10 so that the side surface of the capacitor unit 1 is flat.

The present invention is available for wide industrial use as a stacked electric double layer capacitor with reduced space occupancy and improved safety in handling. The invention is available for wide industrial use also as a stacked electric double layer capacitor with an aluminum laminate film protected.

The invention claimed is:

1. A stacked electric double layer capacitor comprising:
   a capacitor unit including:
      a pair of pressure plates; and
      a current collector plate arranged between the pressure plates;
   an aluminum laminate film wrapping the capacitor unit, and including a periphery that defines and surrounds a hole at a side surface of the capacitor unit;
   an L-shaped current collector terminal including:
      a contact portion in contact with the current collector plate; and
      a terminal portion arranged perpendicular to the contact portion, wherein at least a part of the terminal portion is exposed through the hole of the aluminum laminate film, and connectable to an external circuit, and the terminal portion is heat-welded to the aluminum laminate film; and
   a soft member arranged around the terminal portion inside the aluminum laminate film, the soft member having a thickness identical to that of the terminal portion so that the side surface of the capacitor unit is substantially flat, wherein the exposed part of the terminal portion and the soft member are substantially flat and substantially flush with each other at the side surface of the capacitor unit.

2. The stacked electric double layer capacitor as claimed in claim 1, wherein the external circuit is connected to the terminal portion via a pressure welding terminal.

3. The stacked electric double layer capacitor as claimed in claim 1, wherein the terminal portion includes a threaded hole for connection to the external circuit.

4. The stacked electric double layer capacitor as claimed in claim 1, wherein the terminal portion includes a socket hole for connection to the external circuit.

* * * * *